US012496254B2

(12) United States Patent
Bernstein et al.

(10) Patent No.: US 12,496,254 B2
(45) Date of Patent: Dec. 16, 2025

(54) SPA NOZZLE WITH VARIABLE CROSS-SECTION INERTANCE LOOPS ASSEMBLY AND METHOD

(71) Applicant: DLHBOWLES, INC., Canton, OH (US)

(72) Inventors: Samuel Bernstein, Annapolis, MD (US); Alex Dotzler, Potomac, MD (US)

(73) Assignee: DLHBOWLES, INC., Canton, OH (US)

( * ) Notice: Subject to any disclaimer, the term of this patent is extended or adjusted under 35 U.S.C. 154(b) by 227 days.

(21) Appl. No.: 18/224,601

(22) Filed: Jul. 21, 2023

(65) Prior Publication Data

US 2023/0355470 A1 Nov. 9, 2023

Related U.S. Application Data

(63) Continuation-in-part of application No. 18/076,837, filed on Dec. 7, 2022.

(60) Provisional application No. 63/399,245, filed on Aug. 19, 2022, provisional application No. 63/286,783, filed on Dec. 7, 2021.

(51) Int. Cl.
*A61H 33/00* (2006.01)

(52) U.S. Cl.
CPC . *A61H 33/6057* (2013.01); *A61H 2201/1238* (2013.01)

(58) Field of Classification Search
CPC .................... A61H 33/6057; A61H 2201/1238
USPC ................................. 4/541.6, 541.4; 261/75
See application file for complete search history.

(56) References Cited

U.S. PATENT DOCUMENTS

| | | | | |
|---|---|---|---|---|
| 3,185,166 | A | 5/1965 | Horton | |
| 4,694,992 | A * | 9/1987 | Stouffer | B05B 1/08 239/265.23 |
| 4,709,622 | A * | 12/1987 | Stouffer | B60S 1/54 454/125 |
| 5,333,787 | A * | 8/1994 | Smith | B05B 3/16 239/233 |
| 6,729,564 | B2 * | 5/2004 | Srinath | B05B 1/08 239/592 |
| 6,904,626 | B1 * | 6/2005 | Hester | A61H 33/027 239/599 |
| 6,948,244 | B1 | 9/2005 | Crockett | |
| 7,677,480 | B2 | 3/2010 | Russell | |
| 7,766,261 | B1 * | 8/2010 | Santamarina | A61H 33/6057 239/589.1 |
| 8,869,320 | B1 | 10/2014 | Santamarina | |
| 9,339,825 | B2 | 5/2016 | Koklu | |
| 9,765,491 | B2 | 9/2017 | Gopalan | |
| 2014/0299672 | A1 * | 10/2014 | Gopalan | E01H 1/0809 239/589.1 |
| 2016/0129689 | A1 * | 5/2016 | Gomi | B41J 2/17596 347/9 |

(Continued)

FOREIGN PATENT DOCUMENTS

| | | | | |
|---|---|---|---|---|
| DE | 2421008 | A1 | 11/1974 | |
| WO | WO-0207893 | A1 * | 1/2002 | A61H 33/027 |

*Primary Examiner* — Lori L Baker
(74) *Attorney, Agent, or Firm* — McDonald Hopkins LLC

(57) ABSTRACT

A fluidic geometry, chip, and nozzle assembly capable of providing multiple oscillation frequencies without the need for moving parts is contemplated. A fluidic circuit having feedback loops with differing cross-sectional areas will allow for output of oscillating sprays having different frequencies based upon fluid pressure.

17 Claims, 7 Drawing Sheets

(56) References Cited

U.S. PATENT DOCUMENTS

2017/0350081 A1* 12/2017 Gopalan ............... E01H 1/0809

* cited by examiner

SPA NOZZLE WITH VARIABLE CROSS-SECTION INERTANCE LOOPS ASSEMBLY AND METHOD

RELATED APPLICATIONS

This application claims priority to U.S. provisional patent application Ser. No. 63/399,245 filed on Aug. 19, 2022, as well as a continuation-in-part of U.S. patent application Ser. No. 18/076,837, filed on Dec. 7, 2022, which itself claims priority to U.S. provisional patent application Ser. No. 63/286,783 filed Dec. 7, 2021. All of the foregoing are incorporated by reference.

TECHNICAL FIELD

The disclosure relates to a nozzle assembly that includes a particular geometry of inertance loops for use with a fluidic oscillator that may be useful for generating a spray output of variable frequencies from a nozzle housing.

BACKGROUND

Fluidic oscillator nozzles can be used to generate moving underwater jets that are particularly useful in hot tubs, spas, and pools. For example, U.S. Pat. Nos. 6,904,626; 7,766,261; and 8,869,320 describes a spa nozzle utilizing a feedback-type fluidic oscillator geometry to generate a oscillating fluid spray output underwater, while U.S. Pat. No. 6,948,244 contemplates methods of molding such nozzles. Fluidic oscillators are typically designed to operate at a set frequency for a given pressure. However, it is often desirable, particularly with hot tubs and spas, to adjust certain operational characteristics, such as the pressure and/or frequency of the jets.

An example of an inertance loop can be seen in U.S. Pat. No. 9,765,491. Here, a large-scale inertance loop is provided along with a bypass switch to adjust the frequency of a pulsating air flow useful for leaf blowers.

Although inertance loops have been proposed for adjusting frequencies as noted above, optimization of operating conditions and a reduction in the size of such adjustable circuits is still needed. Further, the conditions inherent to use in hot tubs and spas creates unique challenges, especially given the relationship between temperature and pressure in fluids. Lastly, reductions in manufacturing cost and design complexity—particularly in comparison to the disclosure of the aforementioned patent—would be welcomed.

BRIEF DESCRIPTION OF THE DRAWINGS

The appended drawings form part of this specification, and any information on/in the drawings is both literally encompassed (i.e., the actual stated values) and relatively encompassed (e.g., ratios for respective dimensions of parts). In the same manner, the relative positioning and relationship of the components as shown in these drawings, as well as their function, shape, dimensions, and appearance, may all further inform certain aspects of the invention as if fully rewritten herein. Unless otherwise stated, all dimensions in the drawings are with reference to inches, and any printed information on/in the drawings form part of this written disclosure.

DETAILED DESCRIPTION

Operation of the invention may be better understood by reference to the detailed description, drawings, claims, and abstract—all of which form part of this written disclosure. While specific aspects and embodiments are contemplated, it will be understood that persons of skill in this field will be able to adapt and/or substitute certain teachings without departing from the underlying invention. Consequently, this disclosure should not be read as unduly limiting the invention(s).

As used herein, the words “example” and “exemplary” mean an instance, or illustration. The words “example” or “exemplary” do not indicate a key or preferred aspect or embodiment. The word “or” is intended to be inclusive rather an exclusive, unless context suggests otherwise. As an example, the phrase “A employs B or C,” includes any inclusive permutation (e.g., A employs B; A employs C; or A employs both B and C). As another matter, the articles “a” and “an” are generally intended to mean “one or more” unless context suggest otherwise.

It will also be understood that certain terminology and structures can be described in the context of the anticipated flow of fluids through the disclosed circuits and systems. Thus, upstream or proximal means towards the inlet or source of the fluid, while downstream or distal trends toward the outlet or, in some instances, the oscillating spray jet expelled from the outlet. In the same manner, longitudinal and axial refer to the downstream direction of flow, while transverse or radial means at an angle (usually orthogonal) to that axial direction. Other, similar words and phrases can and should be read in proper context, and persons of ordinary skill in the field of fluidics will appreciate the specialized terminology sometimes employed herein.

A nozzle assembly with a variable cross-section inertance loop assembly and method is disclosed. This assembly, and the various methods associated with it, find particular utility in creating desired frequency outputs for fluidic nozzles and circuits provided proximate to the outlet, and especially those used in percussive therapies commonly found in hot tubs and spas. The nozzle assembly includes a housing configured to receive fluid that is processed through a fluidic oscillator circuit and dispensed from an outlet.

Figure 1A:
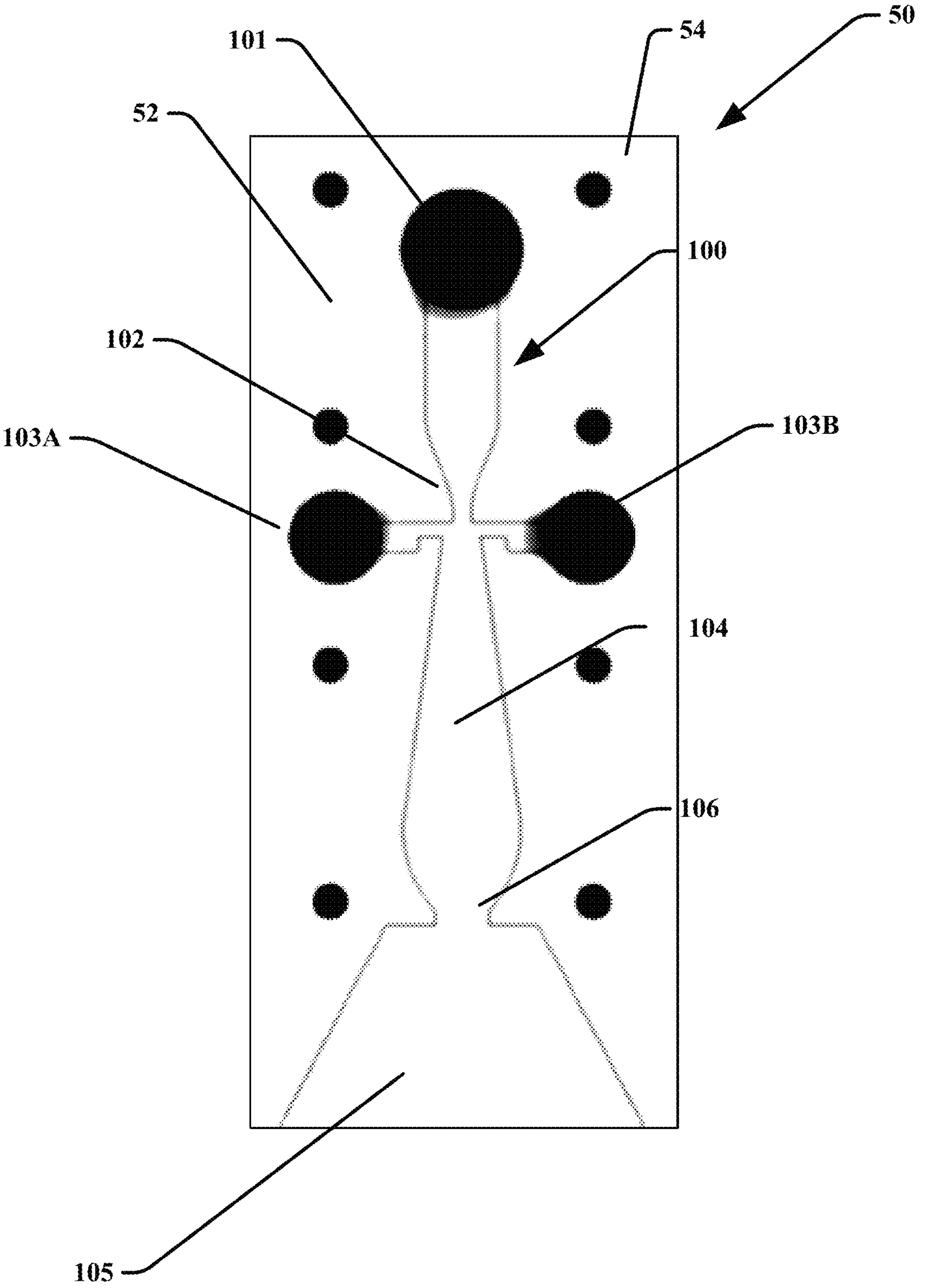
FIG. 1A is a schematic top view of a single stage fluidic oscillating circuit and FIG. 1B is a schematic top view of a multi-stage fluidic oscillating circuit, both being useful in various aspects of the invention.
Figure 1B:
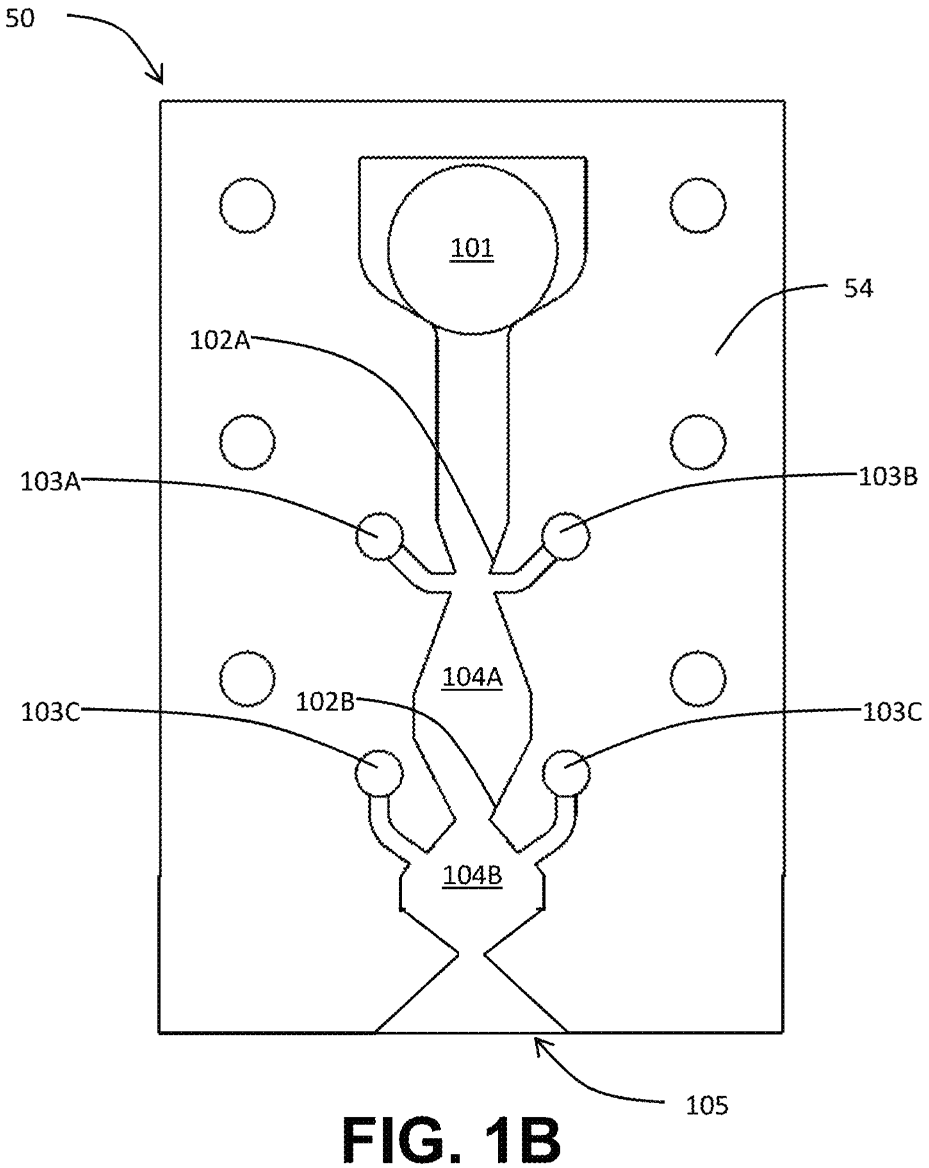

The fluidic oscillator circuit may include a patterned geometrical fluid pathway formed into an insert, such as that illustrated in FIGS. 1A and 1B. A fluidic oscillator circuit 50 is formed in a generally flat surface 52 of planar body 54 that can be received in a slot on the nozzle housing (e.g., a "chip"), or it may be possible to impart these features integrally into the nozzle at the outlet. In some aspects, separate circuits could be provided on each major facing (i.e., the front and back) of the chip. The housing may also be configured to hold multiple chips, or it might be formed integrally with multiple circuits. In each case, the variable cross-section inertance loop(s) contemplated herein can be useful in adjusting, tuning, and optimizing the desired oscillating frequency of the spray/jet produced by the nozzle.

In one exemplary aspect, the circuit 50 defines a geometrical fluid pathway 100 formed on a flat surface of the insert body 54, although it is understood that alternative geometrical fluid pathways could be utilized in a multi-stage circuit like that shown in FIG. 1B (where additional but similar elements retain the same reference numerals). The geometry 100 itself is defined by sidewalls formed in the chip, with through-holes or ports allowing for the introduction of fluid or the accommodation of one or more inertance loops. Generally speaking, in any fluidic geometry, the flow will proceed from one or more inlets 101 disposed at one end of the chip 54, with the outlet 105 formed at the opposite end. Power nozzles, the shape and spacing of the sidewalls, formation of islands or obstructions, and other well-known features in the art of fluidics can be employed to impart specific characteristics to the side, shape, and fluid stream properties of the spray or jet exiting the outlet 105.

Inlet 101 is configured with a single port or manifold to receive fluid from a fluid source. In the single stage embodiment shown here, flow from the inlet 101 proceeds a power nozzle 102 or 102A which is adjacent or slightly upstream from a pair of opposing control or a pair of communicating inertance ports 103A, 103B (and second pair 103C, 103D in a multi-stage circuit), an interaction region 104A (and 104B in a multi-stage circuit), and an outlet region 105. The interaction region(s) 104 may be positioned between the power nozzle(s) 102 and the outlet region 105 and have opposing walls that are wider than the walls of the power nozzle. The outlet region 105 may have a variety of geometries but in the embodiment disclosed, the opposing walls extend outwardly from a narrowing region 106 wherein the opposing walls are spaced wider than the walls along the narrowing region 106 that transitions into the outlet region 105. The outlet region may include opposing walls having various geometries that include dog ears and/or a splitter.

Figure 2:
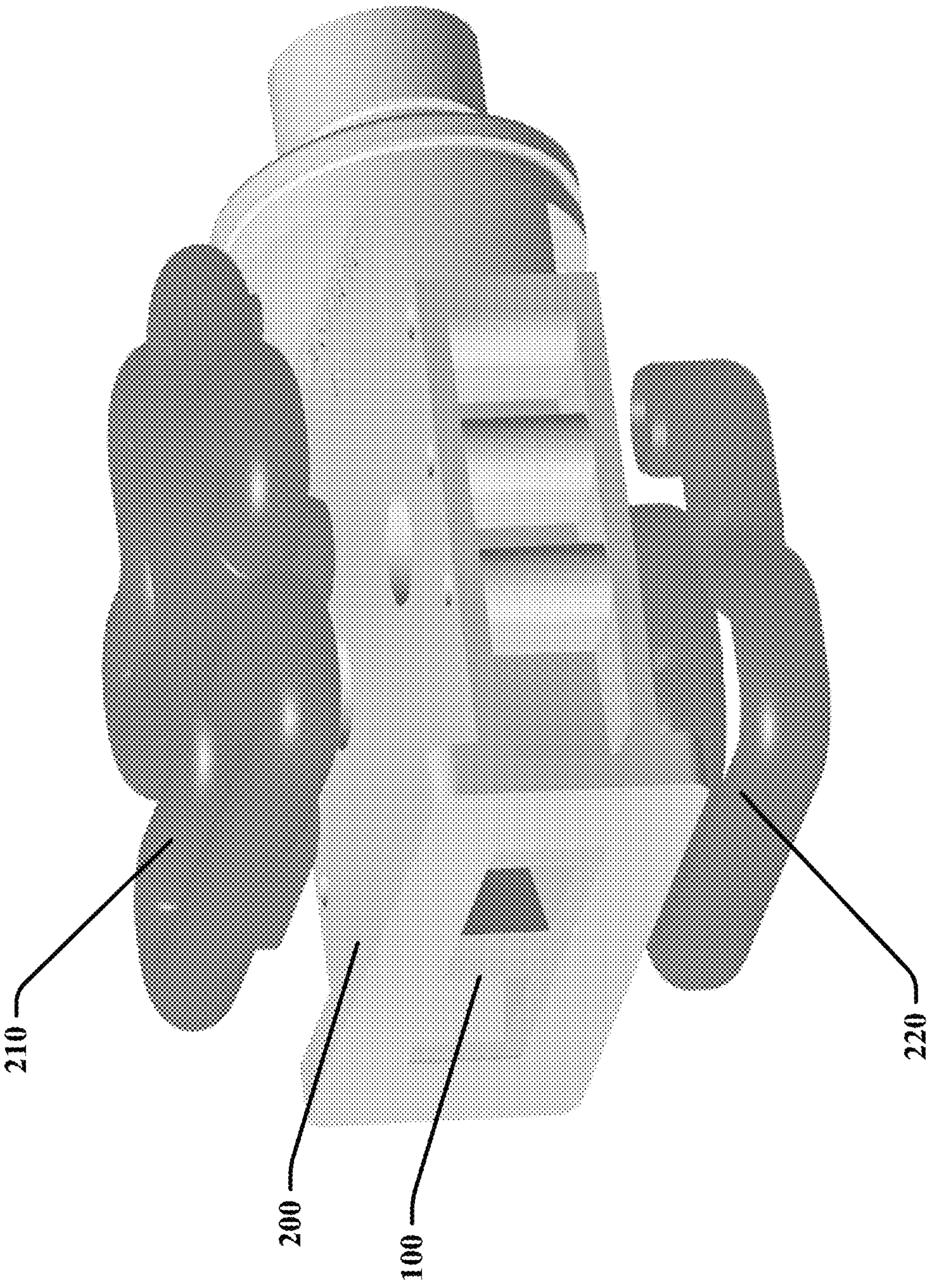
FIG. 2 is an exploded perspective view of selected components of the nozzle assembly according to various disclosed aspects.

An embodiment of a housing 200 for the instant nozzle assembly is illustrated in by FIGS. 2-4. Illustrated is a housing 200 that is configured to receive an insert such as the fluidic oscillator circuit 50 of FIG. 1. The insert considered oscillator having a fluid circuit pathway formed therein. The insert is configured to fit within a cavity in the housing. In some aspects, the chip 54 forms the "floor" or "ceiling" of the flowpath chamber, while a cooperating surface on the interior of the housing (i.e., along a facing of the slot in which the chip is received) seals the flow path and prevents leakage or unwanted fluid loss.

Figure 3A:
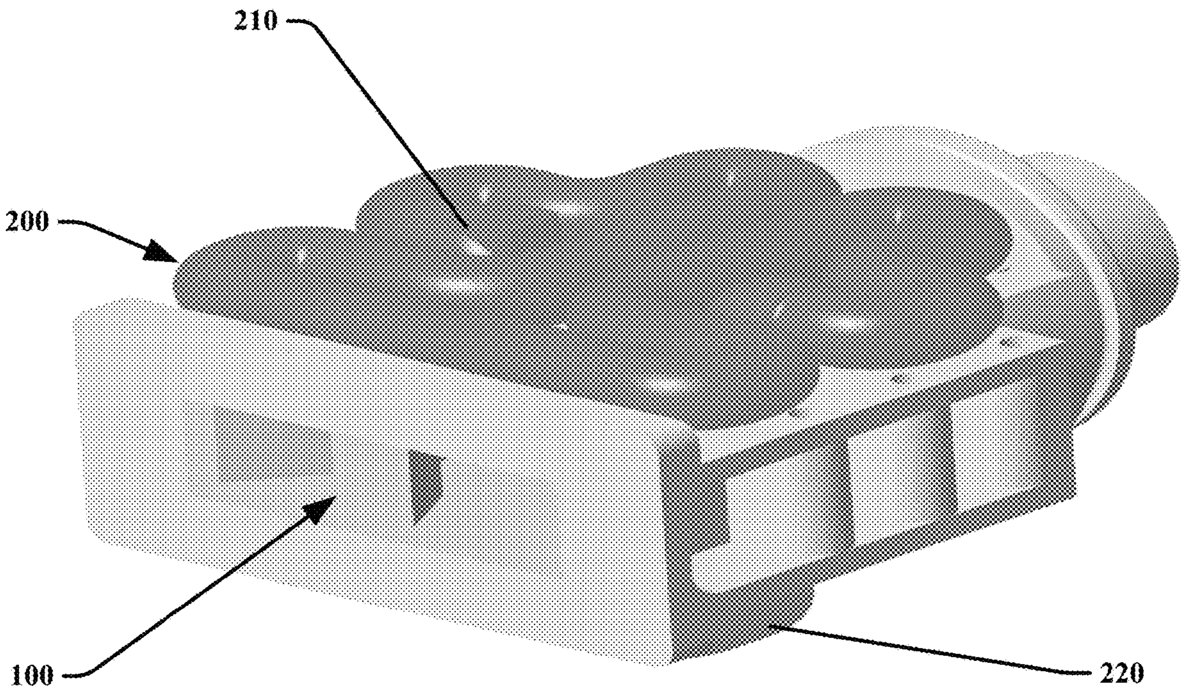
FIG. 3A is a perspective view and FIG. 3B is a side plan view, both showing the the nozzle assembly of FIG. 2.
Figure 3B:
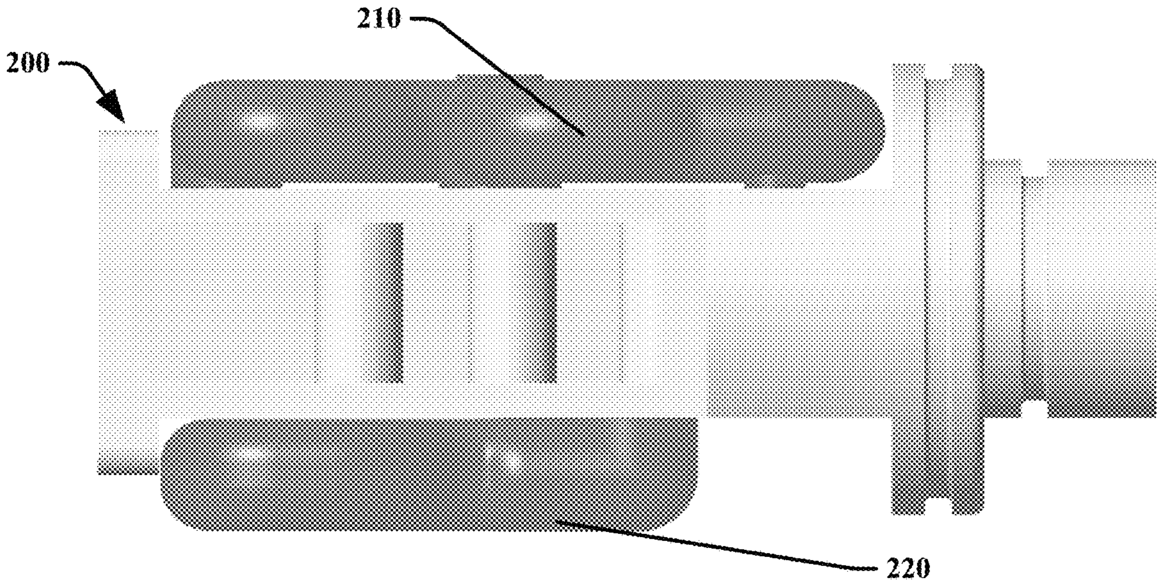

As evidenced by the various inertance ports 103 above, the flowpath is in fluid communication with a first set of tubing defining inertance loop 210 and a second set of tubing defining second inertance loop 220, which can be associated with a discrete chip 54 (as seen in FIG. 1) or in a fluidic geometry including multiple loops/ports. Each set of tubing communicates with the inertance ports 103A, 103B with the flow in the tubing between these ports being the inertance loop. Additional inertance loops may be provided, preferably having different characteristics so as to increase the range of frequencies and pressures that can be accommodated by a single nozzle assembly. Each inertance loop acts to influence the frequency of oscillation of the resulting spray from the outlet of the fluidic circuit. The tubing may be of any rigid construction, and it provides for fluid communication at particular points along the fluidic geometry. FIGS. 2, 3A, and 3B provide further insights on the relationship and positioning of the loops 210, 220 relative to the housing 200 and the general location of the fluidic geometry 100.

Figure 4B:
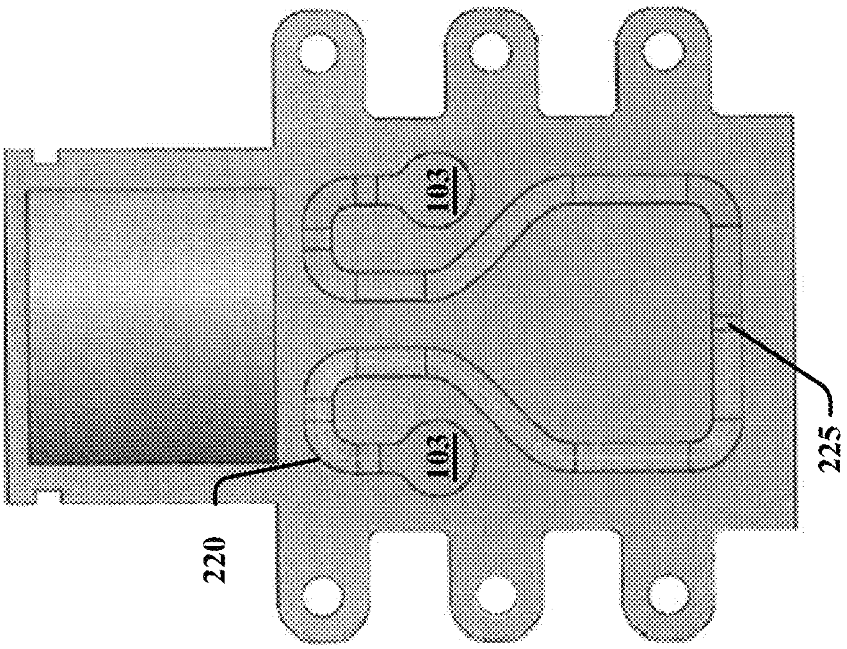
FIGS. 4A and 4B are complimentary top and bottom plan views of the nozzle assembly of FIG. 2 and each showing cross sectional views taken along a central diameter in the tubing, with the former employing a conventional tube having greater length and more tortuosity (i.e., twists and turns) and the latter having a tube with adjusted cross-sectional area according to certain aspects of the invention, thereby reducing tortuosity.
Figure 4A:
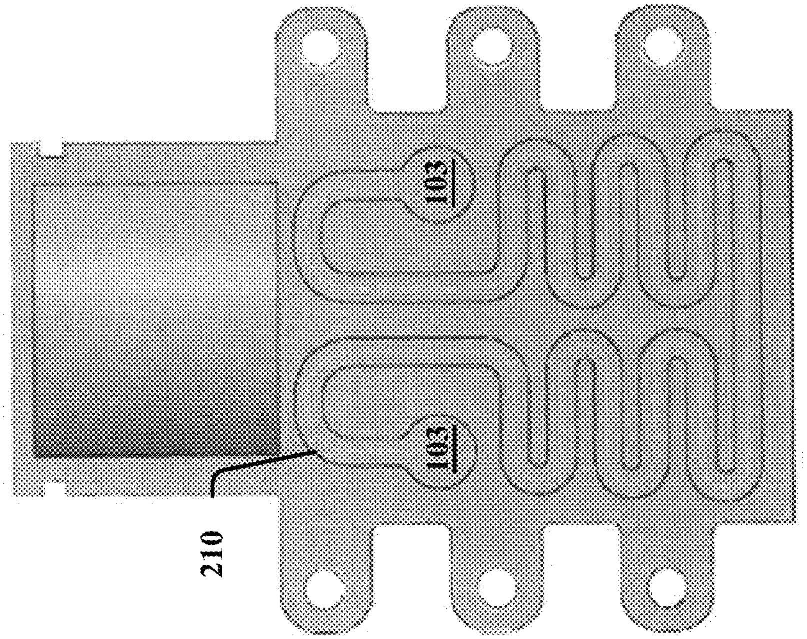

FIGS. 4A and 4B helps to illustrate the two variables critical to the invention: the comparative length of the inertance loops and the overall footprint in which those loops must be contained. With regard to the former, FIG. 4A shows how a tube may be bent or twisted so as to extend its length while remaining within a confined space (here, the surface area of the housing, to which the tubing would be attached or integrally formed). In particular, loop 210 possess a longer tube length including twelve separate 180° bends. As illustrated, it is envisioned that the tube in loop 210 has a length of 259 mm, along with a constant inner profile (e.g., 10.5 mm×2.675 mm) and constant wall thickness.

The large number of bends in loop 210 may cause turbulence or disrupted/varied fluid flow in comparison to a straight tube, especially when the viscosity of the fluids is greater. While such tortuosity can be used advantageously in certain circumstances, too much frictional loss from tortuosity can diminish the ability to transmit pressure signals—possibly to the point of eliminating oscillation in the output of the fluidic geometry. Also, assembling such tube lengths can present challenges.

In comparison, FIG. 4B shows a simplified loop 220 employing a variable cross sectional area tube centered around point 225. Because loop 220 undergoes fewer turns, it has almost half the length (e.g., 130.1 mm). In addition, the dimensions of the inner profile begin at one size (e.g., 7.35 mm×2.675 mm) at the ports 103, but the height decreases linearly until it reaches its smallest point (e.g., 4.35 mm) at point 225.

In this manner, regardless of whether separate loops 210, 220 are used, or if loop 220 is used twice with one tube having a constant width and height while the other varies as described in association with FIG. 4B, it is possible to provide a housing 200 with different inertance loops having the same basic footprint. As will be described in greater detail below, even when the same, reduced-tortuosity layout is used for two loops of differing dimensions (i.e., constant vs. variable), it becomes possible to provide inertance loops that are configured to produce different oscillatory frequencies. In this manner, the output of the jet from the nozzle can be varied, depending upon the input pressure of the fluid, without the need to engage any moving parts.

Figure 5B:
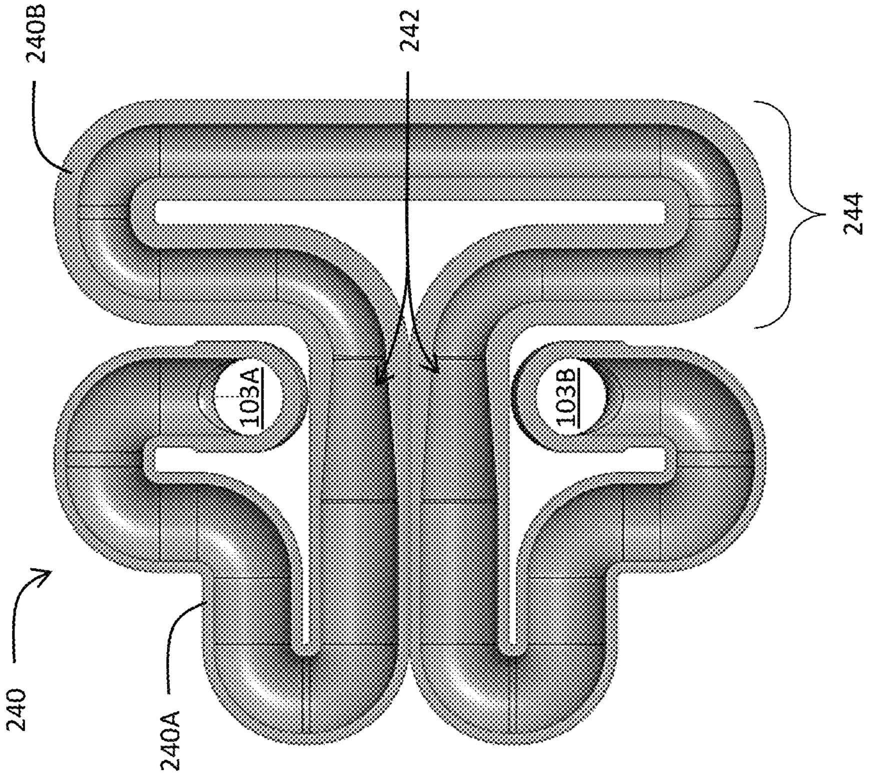
FIGS. 5A and 5B are similar views to those shown in FIGS. 4A and 4B, except that the length and tortuosity of the loops remains identical, while the wall thickness is varied to produced variable cross-sectional area along the length of the latter loop in FIG. 5B.
Figure 5A:
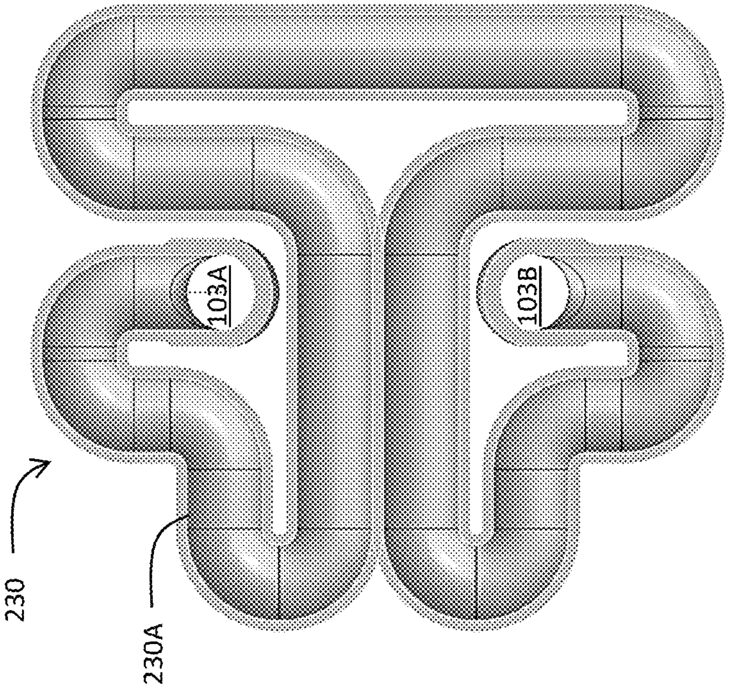

With further reference to FIGS. 5A and 5B, the loop shapes 230, 240 can be of identical configuration and length. In loop 230, the tubing has a constant wall thickness 230A, whereas the thickness of tubing in loop 240 changes in region 242, thereby producing a section of reduced diameter in region 244. In region 244, the tube wall thickness 240B is greater than that outside of region 244 (i.e., thickness 240A). In this manner, tubing of identical length (as is the case in FIGS. 5A and 5B) can nevertheless be imparted with different cross sectional area. Notably, this principle applies irrespective of the tortuosity of the loop, and other identical configurations and lengths can be employed. An advantage to this approach is that the manufacture and attachment of tubing on both sides of the housing 200 would be the same, with only the tube thickness needing be varied (by using different types of tubing).

Figure 6A:
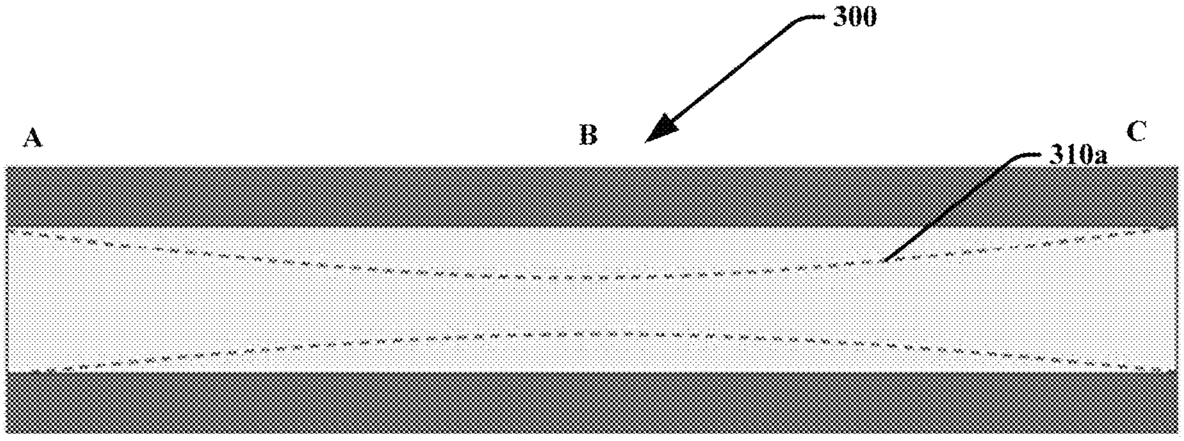
FIG. 6A is a cross-sectional schematic comparison of a constant cross sectional area tube section vs a variable cross sectional area tube section, with FIG. 6B providing a complimentary comparative plot of the same.
Figure 6B:
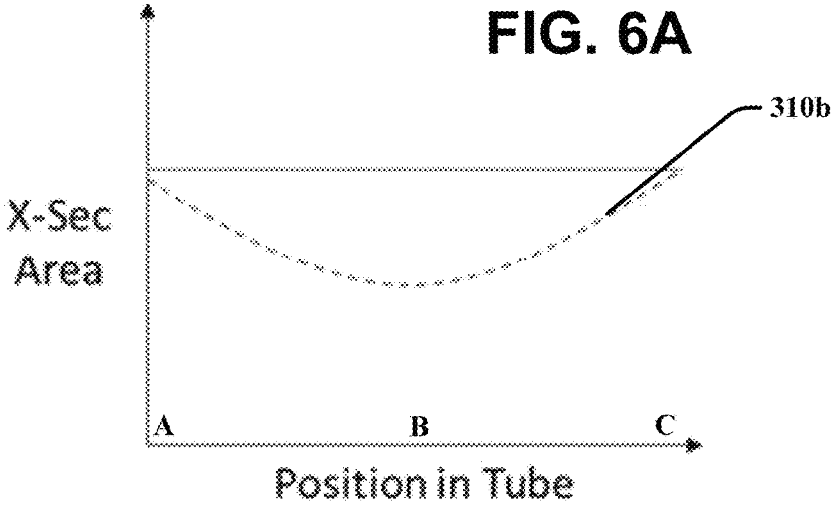

The schematic in FIG. 6A and comparative plot of FIG. 6B helps to illustrate the conceptual underpinnings. FIG. 6A represents schematic cross section of the tubing in a loop along its length, with the dashed lines 310*a* illustrating a variable cross section with a diameter that narrows from larger at points A, C to smaller at point B. While the comparative cross sectional surface area 310*b* at point B in the variable diameter tube is smaller than the constant/straight walled cousin, the curvature in the variable diameter tube ultimately provides for more overall surface area (i.e., the actual length of dashed line 310*b* is longer that the solid line representing the straight walled tube). This greater overall surface area provides more points along which the fluid interacts with the tube, thereby making the variable diameter tube analogous to a longer tube.

This phenomenon can also be explained quantitatively. Each inertance loop has a given cross-section and length so as to transmit pressure signals back and forth between control ports to influence a central jet of fluid, thereby influencing oscillation. As such, inertance can be expressed as I=ρ*length/area, with p being fluid density, the length representing the length of the inertance loop, and the area being the cross-sectional area along the length of the loop.

Given this expression, inertance and oscillation frequency are inversely proportional, so that higher inertance results in a lower oscillation frequency for a given fluidic oscillator. Desirable frequencies of oscillation vary based on the application, but it is common to want as low a frequency as possible for spa nozzles. For a fluidic oscillator employing a constant cross section, such as inertance loop 210 or 230, adjusting the length of the loop is best (and possibly only) way to impact the frequency. However, lengthwise adjustments are often limited by available packaging space, especially if the nozzle is built into a non-fixed unit (e.g., a handheld massage unit). Tortuosity presents another consideration, with excessive twists being potentially detrimental to oscillation of the output jet.

In view of these challenges, the inventors discovered the use of a variable cross sectional shape along the inner surfaces within the inertance loop provides another variable by which frequency can be tuned, as described in loops 220 and 240 above. Advantageously, this arrangement allows for retaining the same length of the inertance loop, meaning that packaging space need not be as significant of a design constraint as in previous approaches. Also, the use of a variable diameter loop and a constant diameter loop provides an elegant solution that can implemented without altering the footprint of the loop on one side of the housing and/or chip in comparison to the other. It also allows for the possibility of selecting from a variety of differently sized tubes in order to fine tune the desired oscillating frequency vs. the expected operating pressures of the spa for a single, standardized chip/circuit.

Used herein the term variable cross-section inertance loop describes that the inner surface of the loop has a change in dimension along a portion of its length that either decreases a cross sectional area along its length or increases a cross sectional area along its length.

Further, this concept can be described mathematically. The constant-diameter tube has length L and cross-sectional area A. The variable-diameter tube has length L and cross-sectional area of approximately (D1+D2)/2 assuming the diameter of the tube varies linearly over its length, the effective diameter is just the average of the min and max diameters. Given that inertance is I=density*L/A, the tube with variable diameter will have a greater inertance.

FIGS. 5A and 5B illustrate a clear distinction between constant cross section inertance loop (FIG. 5A) and variable cross section inertance loops (FIG. 5B). The loop with variable cross section produced about 40% more inertance despite the loops having a similar length.

The use of variable cross-sectional areas along the length of the inertance loops allows for higher inertance within the same packaging space, thereby widening the window of available frequencies for a given fluidic oscillator. Additionally, the variable cross-section could also be used to fit the same amount of inertance in a smaller space, thereby reducing manufacturing cost and complexity.

Based on the equation, I=ρ*length/area, one would think that simply reducing cross-sectional area of the loop would allow it to be made extremely short (given a relatively tiny cross-sectional area). There are limits to this, however. Inertance is defined as "a measure of the pressure difference in a fluid required to cause a unit change in the rate of change of volumetric flow-rate with time." While the aforementioned equation provides a useful model for constant cross-section cases, the reality is more complicated. Applicant discovered that relatively smaller cross-sectional shapes result in an outsized effect of viscous forces within such an assembly, meaning that the pressure required to move flow through an inertance loop of a given length varies non-linearly as a function of cross-sectional area. The exact relationship between pressure and the rate of change of volumetric flow-rate with time for a given system depends on scale, geometry, and other factors.

In general, the same principles which apply to reducing pressure drop in a system of pipe flow also govern the behavior of fluid flow in an inertance loop. Sharp angles, abrupt changes in cross-section, etc. may result in larger frictional losses in the flow. Given that inertance loops serve to transmit pressure signals between control ports, these losses diminish the signal —potentially to the point of inability to create oscillations in a central jet of fluid. Providing inertance loops with a variable cross-sectional shape along its length is a way to effectively design for increased control over the desired frequency of oscillation for a fluidic oscillator nozzle assembly.

In these embodiments, the inlet/outlet of the inertance loops 220, 240 are provided along the housing 200 in a configuration that is generally perpendicular to the axis of the flow of water through the nozzle. The length of the inertance loops is positioned generally parallel to the axis of the flow of water through the nozzle to allow for the loops to be placed in appropriate packaging (i.e., for use with spa nozzle housings). Notably, use of the variable cross-section inertance loops such as those illustrated in FIGS. 4B and 5B reduce the packaging space for a given amount of inertance or otherwise allows for packaging of the same amount of inertance into a smaller volume. Some products may necessitate the use of variable cross-section inertance due to the packaging limitations which would otherwise be unavailable with constant cross-section type inertance loops as disclosed by FIGS. 4A and 5A.

Having described preferred embodiments of a new compact fluidic nozzle assembly, variable cross section inertance loop geometry and improved method, it is believed that other modifications, variations and changes will be suggested to those skilled in the art in view of the teachings set forth herein. It is therefore to be understood that all such variations, modifications and changes are believed to fall within the scope of the present disclosure.

Although the disclosure has been described with reference to certain embodiments detailed herein, other embodiments can achieve the same or similar results. Variations and modifications of the disclosure will be obvious to those skilled in the art and the disclosure is intended to cover all such modifications and equivalents.

We claim:

1. A nozzle assembly capable of producing a oscillating spray jet with variable oscillation frequencies depending upon fluid pressure, the assembly comprising:

a fluidic geometry, formed in a flat surface of a planar body, having an inlet admitting pressurized fluid, at least one power nozzle, at least one interaction chamber, and a pair of inertance ports communicating with the fluidic geometry;

a housing containing the planar body; and an inertance loop comprising a tube fluidically connecting the pair of inertance ports, said tube having a variable diameter so that a midpoint along an internal section of the tube is positioned between the pair of inertance ports, said midpoint having a smaller cross-sectional diameter in comparison to the diameter at each of the pair of inertance ports; and wherein the inertance loop is: i) attached to a major facing of the housing so as to direct flow within the inertance loop in a plane that is parallel to the flat surface, and ii) contained within a footprint of the major facing.

2. The assembly of claim 1 wherein the fluidic geometry accommodates a first pair of inertance ports connected by the inertance loop and a second pair of inertance ports, said second pair of inertance ports connected to a second inertance loop having a different configuration in comparison to the first inertance loop.

3. The assembly of claim 2 wherein the different configuration of the second inertance loop consists of a tube having a constant diameter.

4. The assembly of claim 3 wherein the tube of the second inertance loop has a different length in comparison to the tube of the first inertance loop.

5. The assembly of claim 2 wherein the different configuration of the second inertance loop consists of a tube having a different length in comparison to the tube of the first inertance loop.

6. The assembly of claim 2 wherein the different configuration of the second inertance loop consists of a tube having a different cross sectional internal area in comparison to the tube of the first inertance loop.

7. The assembly of claim 6 wherein the first and second inertance loops are configured to selectively allow ambient fluid communication with the pressurized fluid so as to change a frequency of oscillation in the fluid passing through the outlet.

8. The assembly of claim 7 wherein the fluidic geometry is a single stage fluidic oscillator.

9. The assembly of claim 2 wherein the tubes of both of the first and second inertance loops are attached to the housing.

10. A method of controlling the frequency of oscillation in a fluidic circuit, the method comprising:

providing a fluid having a preselected pressure to the inlet of a fluidic circuit, said fluidic circuit including ports to two separate inertance loops;

configuring each of the two separate inertance loops a different total cross-sectional area along a length of each of said two separate inertance loops; and adjusting the preselected pressure of the fluid so as change a frequency of oscillation of fluid dispensed from an outlet of the fluidic circuit.

11. The method of claim 10 wherein the length of each of said two separate inertance loops is identical.

12. A fluidic circuit producing an oscillating spray, said oscillating spray having a frequency that changes in response to fluid pressure provided to the circuit, the circuit comprising:

an inlet feeding fluid to a circuit;

a power nozzle disposed in the circuit downstream of the inlet;

a first inertance loop disposed in the circuit having a first pair of communication ports positioned on opposing sidewalls, wherein the first inertance loop is downstream of the inlet and includes a first tube connecting the first pair of communication port so that the first tube has a variable diameter;

a first interaction chamber positioned adjacent to the first pair of communication ports;

an outlet positioned downstream of the first interaction chamber, said outlet dispensing an oscillating spray of the fluid at a frequency that changes in response to fluid pressure provided to the inlet; and a second inertance loop disposed in the circuit having a second pair of communication ports positioned on opposing sidewalls, wherein the second inertance loop is upstream from the first pair of communication ports and includes a second tube connecting the second pair of communication ports, and wherein a total cross sectional surface area along the length of the second tube is different than a corresponding total cross sectional surface area along the length of the first tube.

13. The circuit of claim 12 further a second interaction chamber interposed between second pair of communication ports and the first pair of communication ports.

14. The circuit of claim 12 wherein the first tube and the second tube have identical lengths.

15. The circuit of claim 14 wherein the first tube and the second tube have an identical number of turns.

16. The assembly of claim 1 wherein the inertance loop contains at least three separate 180° bends.

17. The assembly of claim 1 wherein the inertance loop contains more than four separate 180° bends.

* * * * *